US011985746B2

(12) United States Patent
Tulloch

(10) Patent No.: US 11,985,746 B2
(45) Date of Patent: May 14, 2024

(54) SENSOR TO CONTROL LANTERN BASED ON SURROUNDING CONDITIONS

(71) Applicant: William Tulloch, Bristol (GB)

(72) Inventor: William Tulloch, Bristol (GB)

( * ) Notice: Subject to any disclaimer, the term of this patent is extended or adjusted under 35 U.S.C. 154(b) by 0 days.

(21) Appl. No.: 17/535,048

(22) Filed: Nov. 24, 2021

(65) Prior Publication Data

US 2022/0167480 A1 May 26, 2022

Related U.S. Application Data

(60) Provisional application No. 63/117,462, filed on Nov. 24, 2020.

(51) Int. Cl.
*H05B 47/105* (2020.01)

(52) U.S. Cl.
CPC .................................. *H05B 47/105* (2020.01)

(58) Field of Classification Search
CPC .. H05B 47/105; H05B 47/155; H05B 47/115; Y02B 20/40
See application file for complete search history.

(56) References Cited

U.S. PATENT DOCUMENTS

| | | | | |
|---|---|---|---|---|
| 11,350,506 | B1 * | 5/2022 | De Oliveira Fanti | H05B 47/105 |
| 2017/0347432 | A1 * | 11/2017 | Blum | H05B 47/11 |
| 2018/0252396 | A1 * | 9/2018 | Ashoori | H05B 47/11 |
| 2020/0217468 | A1 * | 7/2020 | Brown | H04W 4/38 |
| 2021/0279523 | A1 * | 9/2021 | Jang | G06V 10/762 |
| 2021/0302621 | A1 * | 9/2021 | Brown | G06F 3/14 |
| 2021/0329756 | A1 * | 10/2021 | Chen | H05B 47/12 |
| 2023/0020737 | A1 * | 1/2023 | Harrison | G06F 30/20 |

FOREIGN PATENT DOCUMENTS

KR 20130055873 A * 5/2013

OTHER PUBLICATIONS

Machine Translation KR20130055873A (Year: 2013).*

* cited by examiner

*Primary Examiner* — Raymond R Chai
(74) *Attorney, Agent, or Firm* — Conley Rose, P.C.; Michael W. Piper; Elexis A. Jones

(57) ABSTRACT

An electronic device to control illumination levels of a light emitting device. The electronic device comprises a microcontroller that is adapted to: receive data relating to an object sensed by a sensor; provide the received data to a machine learning algorithm; and output a control signal to define an illumination pattern and an illumination level of the light emitting device based on analysis of the received data.

18 Claims, 6 Drawing Sheets

SENSOR TO CONTROL LANTERN BASED ON SURROUNDING CONDITIONS

CROSS-REFERENCE TO RELATED APPLICATIONS

This application claims the benefit of U.S. Provisional Application No. 63/117,462 filed on Nov. 24, 2020, which is incorporated herein by reference in its entirety for all purposes.

BACKGROUND

Field of the Invention

The invention relates generally to sensor to control lantern based on surrounding conditions

Background

Currently, there are several systems for lantern control. Some of these solutions attempt to control lighting via active in-person monitoring of closed-circuit television systems. Other solutions control lanterns via central management systems, broadcast a simple on-off instruction.

SUMMARY OF THE INVENTION

It would be desirable to have a lantern capable of autonomously determining its own optimum illumination level or pattern based on its surrounding environment. There currently exists a need in the industry for a lantern that does not require active monitoring at a centralised location to achieve its optimum illumination level. This active monitoring could include active optical monitoring by closed circuit television system, or telemetry streamed back to a home base or base station.

Disclosed in an electronic device capable of detecting given elements in the surrounding environment and independently and autonomously outputting a predetermined lantern control signal based on that detection using an embedded machine learning/computer vision algorithm. Elements in the surrounding environment, and the resulting actions they trigger, could be defined by the user.

The user of the device, or system of devices, could be a local government authority with the responsibility to operate and maintain local lighting infrastructure. It could also be a private enterprise acting the behalf of this authority. The system could be near-autonomous, only requiring control inputs and preference updates from a single human user for a city-wide system.

Detection elements of interest and resulting illumination actions could include, but not be limited to, increasing illumination of a lantern in the presence of a moving or stationary person, or a moving vehicle. This would differentiate the device from a simple motion sensor-equipped lantern, as it would filter out moving debris and moving animals.

Other detection elements could include environmental hazards such as flooding, fallen trees, icing etc. These could trigger illumination warnings and messages back to a central monitoring station.

The device would typically utilise a low-cost microcontroller, such as ESP32 or Ardunio class, but could use any electronic system.

The device could be one continuous unit, or be made up of a standard low-cost microcontroller, such as ESP32 or Ardunio class, plus an additional shield unit. The device would typically utilise a camera for optical detection but could use any type of sensor.

The device may be powered by any means including mains, battery, solar etc in any combination or alone.

The device may output a range of lantern control signals, including but not limited to DALI and 0-10V.

The device may include any type of detection means, including but not limited to computer vision, machine learning or artificial intelligence algorithms including but not limited to Convolutional Neural Networks created using open-source platforms such as Tensorflow, Tensorflow Lite, or Tensorflow Micro. The device may be connected to other devices in a network or be standalone. The device may be connected to the lantern by an external connector (including but not limited to NEMA or Zhaga types) or be integrated into the structure of the lantern. The device may also serve as a certified or uncertified electricity metering device to record the energy saved by its operation.

The device may be included in the original lantern as manufactured or be retrofitted. The device may be capable of receiving another lantern control signal as an input from another device or could standalone. This additional input signal could form part of the algorithm to determine optimum light levels and patterns or be discarded.

The disclosed device is unique when compared with other known device and solutions because it provides (1) the capability to apply an autonomous detection and decision-making process at the point of illumination. Similarly, the disclosed method is unique when compared with other known processes and solutions in that it provides (2) the ability to embed this capability at every lantern in a network in a cost-effective manner; (3) the ability to quickly and easily integrate this capability onto existing lanterns.

The disclosed device is unique in that it is structurally different from other known devices or solutions. More specifically, the device is unique due to the presence of (1) a detection and analysis algorithm, typically machine learning or artificial intelligence, hosted on a microcontroller; (2) an optical input and control signal output from the same device.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Sensor to control lantern based on surrounding conditions may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

The present invention is directed to sensor to control lantern based on surrounding conditions.

The most complete example of the device includes a low-cost microcontroller such as an ESP32, with an integrated optical sensor. The microcontroller includes the capability to analyse the input from the optical sensor using machine learning algorithms. The device outputs a lantern control signal to define the optimum light patterns and levels given the analysis of the algorithm.

Figure 1:
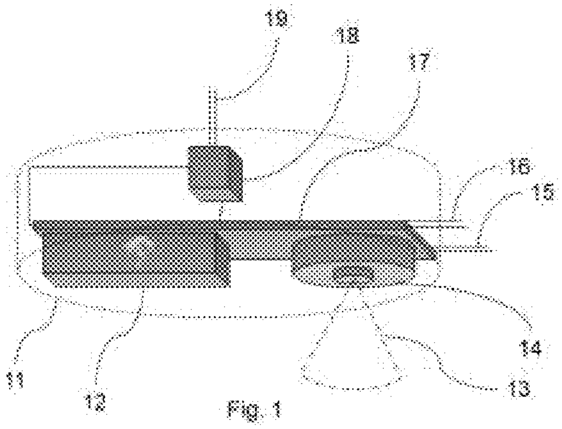
FIG. 1. is an isometric view of an example device layout

FIG. 1 illustrates a particular example of the device 18. In this particular example, the device is shown with an outer housing 11. The form of the housing 11 can vary in shape and material, but will typically be cylindrical or cuboid in shape, and typically plastic or metallic in construction.

Also shown is a computer chip hosting a machine learning algorithm 12 with a certain field of view 13 of the surrounding environment, provided by a sensor 14, mounted on a printed circuit board 17.

The size and capability of the computer chip 12 may vary. This particular example utilises a microcontroller similar to an ESP32-S, or ESP32-CAM, but may include a device as powerful as the Raspberry Pi. The means by which the device analyses the input signal (video imagery collected by a camera in one example) may vary, but this particular example utilises a machine learning algorithm. The size and complexity of this algorithm may vary, but this particular example utilises a quantised machine learning algorithm.

Input data to these machine learning algorithms could be modulated and controlled in any manner. This example utilises background removal to isolate the detected object in the input optical signal and determine relative direction of travel. The type of input signal provided by the sensor 14 may vary, but this particular example uses video imagery of the surrounding environment provided by an optical sensor or camera. The size and capability of this sensor may vary, including the wavelength of light detected. One example may utilise the visible spectrum. Other input signal and sensor examples could include, but are not limited to, temperature input signals provided by a thermometer, or sound level input signals provided by a microphone. These could be used in any combination or permutation.

The field of view 13 may be in any specified direction, or multiple directions.

The printed circuit board 17 is shown here as a single integrated piece, but may be of multiple parts.

This particular device has capacity for both lantern control signal output 15 and input 16. Only the ability and facility to generate an output 15 is mandatory. The ability and facility to generate an input 16 is optional. The type of signal may vary. This particular example utilises a DALI signal, but may also use 0-10V or other systems.

Shown here is a means to power the device 18, and a power input 19. These can be of any voltage and current. This particular example utilises 3.3V-5V, with a current in the milliamp range supplied to the circuit board 17, with mains power supplied to the module 19, converted at 18. The power supply unit 18 may be separate to the circuit board 17, as shown, or be integrated into a single part.

Not shown in this illustration is the optional facility for the device to connect to a network of other similar, or dissimilar, devices in a wireless manner. This may include the connection of dissimilar devices to collect, for example, optical and audio input signals respectively. This may include any configuration of antennae and wireless communication protocols. One option would be the inclusion of antennae and communications protocols capable entering the device into a Zigbee type network. Other options include Bluetooth, Wifi, Cellular (4G, 5G, etc.), LoraWAN, and SigFox. Multiple devices connected as part the wireless network described above could act together to add functionality. For example, a moving person detected at a streetlight-mounted device at one end of a street could activate the light in that area to a level determined by the user and signal other devices in the vicinity to illuminate to a second level determined by the user.

Figure 2:
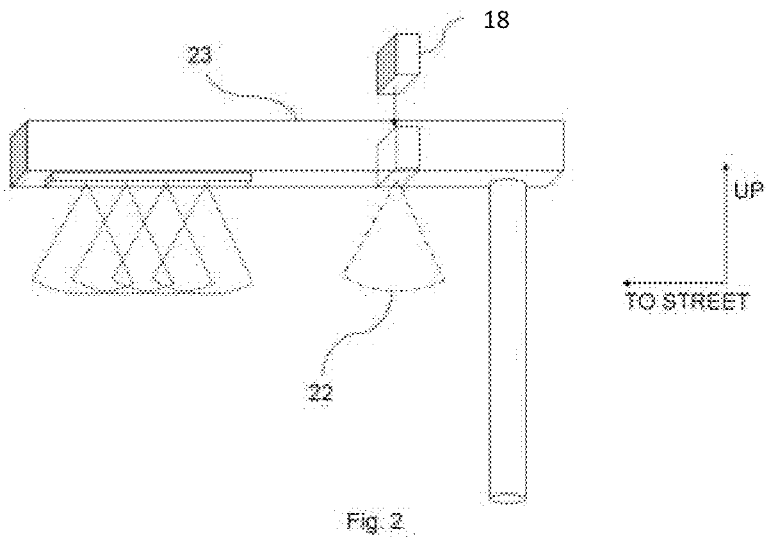
FIG. 2. is an isometric view of an example installation (in-built/integrated)

FIG. 2 illustrates a particular example of the device installed to a lantern. In this particular embodiment, the device 18 is shown built into a conventional functional street lantern 23. The device may be installed into any light emitting device, and is not limited to a street lantern.

The device 18 may be installed in-situ wherever the lantern 23 is in use, or installed in a factory setting as part initial build or retrofit.

The device 18 has a particular field of view 22. This field of view may vary from the orientation shown.

Note the orientation shown in this example, with the lantern 23 mounted on a vertical light pole, protruding out towards and above the street. This is included for clarity only. The device 18 may be added to a lantern 23 in any orientation.

Figure 3:
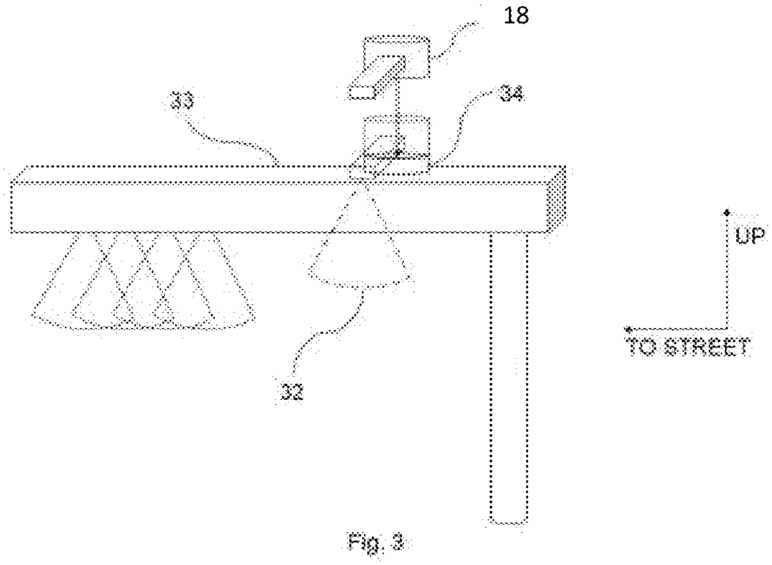
FIG. 3. is an isometric view of an example installation to a top-mounted connector type (e.g. NEMA)

FIG. 3 illustrates a particular example of the device installed to a lantern. In this particular embodiment, the device 18 is shown added to a conventional functional street lantern 33, via an external connector 34. The device may be installed into any light emitting device.

The device 18 may be installed in-situ wherever the lantern 33 is in use, or installed in a factory setting as part initial build or retrofit.

The device 18 has a particular field of view 32. This field of view may vary from the orientation shown.

The external connector 34 may be of any type. This particular example utilised a NEMA 7-pin connector. Other examples include but are not limited to NEMA 5-pin and Zhaga. The external connector 34 may be capable of supplying power to the device 18, and receiving the lantern control signal.

In this particular example, an arm is added to the device 18 in order to maintain field of view 32 downward.

Not shown as part of this installation, is the optional configuration to host an additional and separate control node to the device 18, which would have the ability supply an optional input control signal to the device 18. The connection of this additional control node may be by any means. An example could be the addition of a similar connector 34 atop the device 18.

Note the orientation shown in this example, with the lantern 33 mounted on a vertical light pole, angled out towards the street. This is included for clarity only. The device 18 may be added to a lantern 33 in any orientation.

Figure 4:
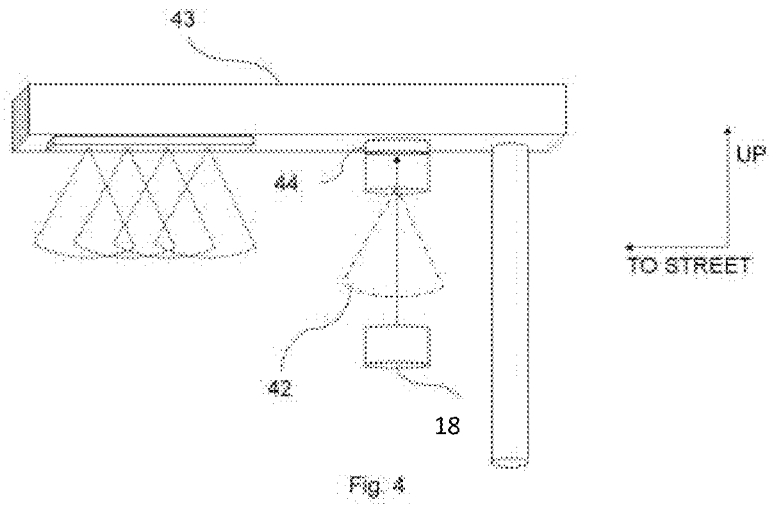
FIG. 4. is an isometric view of an example installation to a base-mounted connector type (e.g. Zhaga)

FIG. 4 illustrates a particular example of the device installed to a lantern. In this particular embodiment, the device 18 is shown added to a conventional functional street lantern 43, via an external connector 44. The device may be installed into any light emitting device.

The device 18 may be installed in-situ wherever the lantern 43 is in use, or installed in a factory setting as part initial build or retrofit.

The device 18 has a particular field of view 42. This field of view may vary from the orientation shown.

The external connector 44 may be of any type. This particular example utilised a Zhaga connector. Other examples exist. The external connector 44 may be capable of supplying power to the device 18, and receiving the lantern control signal.

The external connector 44 is shown located underneath the lantern 43 in this example. The location of this connector 44 could be at any point on, or off, the lantern main body 43.

Note the orientation shown in this example, with the lantern 43 mounted on a vertical light pole, angled out towards the street. This is included for clarity only. The device 18 may be added to a lantern 43 in any orientation.

Figure 5:
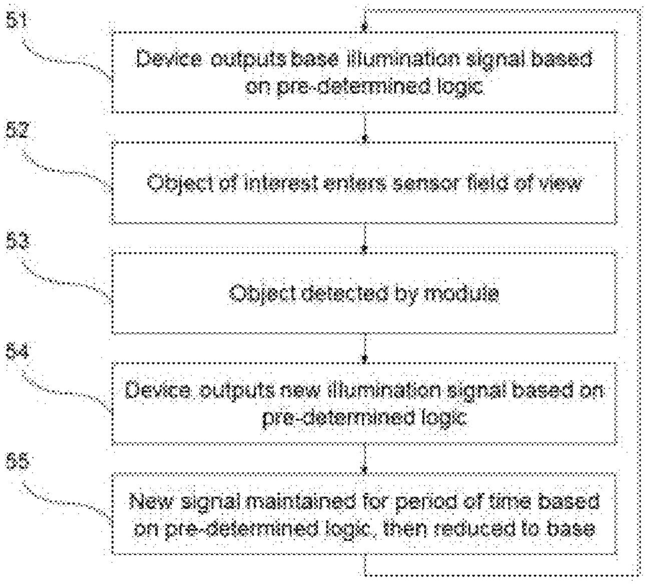
FIG. 5. is a flow diagram of the typical operation of the device

FIG. 5 illustrates a particular example of the process whereby the device controls the illumination level of a lantern.

In this example, the device follows a five-step cyclic process 51-55.

When no objects of interest are detected, the system will be functioning at a steady state, pre-determined base lighting level 51. This base level could be set at zero (no light), or some much reduced ambient base level (20% power for example). This base lighting level could be set at a level to reduce power consumption and light pollution levels, while maintaining public safety. The level could be unique to certain areas. For example, in remote areas of natural habitat the base level could be set very low to minimize impact on local fauna. In high-traffic or high-crime areas, this base level could be set higher to maximise public safety. Setting this base level could be done remotely by a user and iterated manually or automatically to maximise benefits over time.

The process is triggered at block 52 by the entry of an object of interest into the field of view of the device. This could also be triggered manually or by remote if required. Objects of interest in this example are a moving or stationary person, or a moving vehicle. This would differentiate the device from a simple motion sensor-equipped lantern, as it would filter out moving debris and moving animals. Other objects of interest could include environmental hazards such as flooding, fallen trees, icing etc. These could trigger illumination warnings and messages back to a central monitoring station.

Object detection 53 could be by any method. In this example, a machine learning computer vision algorithm is used to detect the object of interest. This algorithm could take any form; supervised, semi-supervised, unsupervised, reinforcement or deep learning. This example utilises a deep learning model with a computer vision system based on a Convolutional Neural Network (CNN) trained to recognise given objects in the optical input signal of the sensor by training on given sample image sets. The CNN achieves image classification and object detection by extracting features using a range of filters, highlighting features such as edges and key shapes and calculates the probability that a shape is similar to one it has been trained to recognise. The CNN is created, trained, evaluated, and run using the Tensorflow open-source platform for machine learning, compressed using Tensorflow Lite, and finally quantised using TinyML to operate on a microcontroller device. Other possible variations of Neural Networks include, but are not limited to, Perceptron, Feed Forward, Recurrent Neural Network (RNN) Auto Encoder (AE). These variations provide alternative combinations of speed and accuracy. Other possible means to create the Neutral Network include the Keras library in Python.

Illumination signal outputted 54 could be of fixed value or variable. Length of time new illumination level is maintained, and the rate at which it is decreased back to base level may be fixed or variable. Variation may depend on outside factors including, but not limited to; type of detection event; number and frequency of detection events: time of day; and geographic location. These variables may be permanent pre-programmed features of the device, or may be recoded directly or by remote in response to feedback from the device's environment.

In this example, detection events result in no illumination response during daylight hours. Conversely, during nighttime hours, the detection of a moving person may result in light power rising from 20% to 100% over 1 second, and held for 120 seconds, before reducing back to 20% over a 20 second period, for example. If another moving person is detected, the process restarts. If the process restarts more than 5 times in 1000 seconds, for example, the light levels may stay up for 3000 seconds to avoid a "pulsating" light pollution effect. A different response pattern may be provided for moving vehicles, which could be similar in all respects except for a reduction of the period at which the illumination level is held at 100% power. For example the period may be reduced from 120 seconds to 60 seconds, as it could be assumed that the moving vehicle will leave the scene quickly and have its own lights. It will be understood that illumination levels, periods of illumination, and rate of change between illumination levels may vary depending on the factors or variation examples highlighted above. These factors may be fixed or variable. Fixed, such as at the point of manufacture, or variable, such as by the decisions and input of a central user, or as the output of a parallel machine learning algorithm.

Once the illumination cycle has completed, and no objects of interest remain in the field of view, the lantern will return to its base power levels 55, and await the next detection event.

Not shown here is the option to notify other devices in a network to the detection of a certain object, and the optimum illumination level determined by the device. This includes notifying other sensors of approaching objects, potentially allowing for illumination levels to be brought to a mid-range level in preparation for the arrival of the object. This could be achieved via a short-range wireless network (e.g. Bluetooth, Wifi etc.). Directionality of a detection event relative to a system of devices could be achieved by any means. This could include manually indexing each device with a location tag, automatically meshing devices in a network, or giving each device the means to locate itself in space (e.g. GPS etc.). This could result in a moving person having the lights in their vicinity raised from a base level (20%) to a mid-level (50%), as well as nearest light raised to 100%, to increase public safety.

Not shown here is the option to notify the central user of key information such as number of certain detection events. This could include a "heat map" of detected persons after dark to map movement in the nighttime economy. This information could be used to direct civic resources such as police/security patrols. This could also include detection and alerts for environmental hazards including, but not limited to, icing and fallen trees. Civic resources could also be deployed based on this data. This could be achieved via a long-range network (e.g. Cellular, LoraWAN etc.).

Other data which could be provided to the central user includes the metering of energy consumptions and savings against a baseline, and communication back to a monitoring station.

Figure 6A:
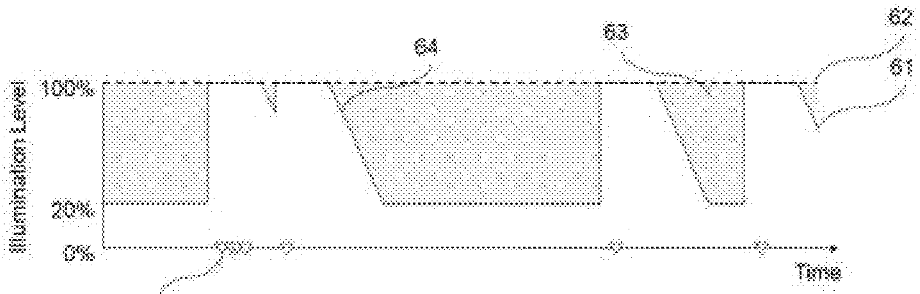
FIGS. 6A-6B. are an example illumination profile generated by the device
Figure 6B:
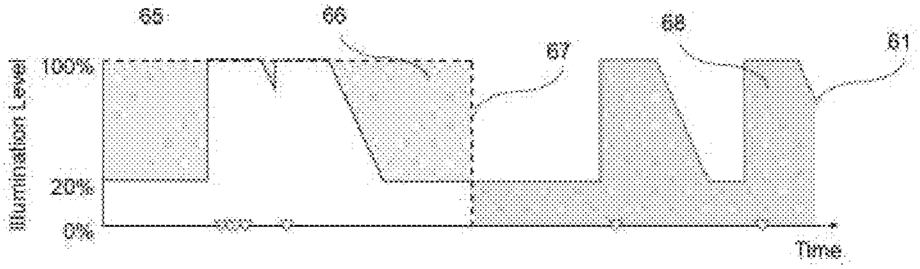

FIGS. 6A and 6B illustrate two particular examples of the lighting patterns created by device. In these two examples, the device outputs the same lantern control signal over time 61, based on the same detection events 65. This is compared with two example control signals typical of conventional systems, including an always-on profile 62 (upper) and binary on-off profile 67 (lower).

In this particular example, the device utilises a vertical illumination gradient, cool down lag, darkening gradient 64, 100% max illumination, and 20% min illumination. These factors are controlled by the device and may vary from the example shown depending on a number of variables including, but not limited to; type of detection event 65; number and frequency of detection events: time of day; and geographic location. These variables may be permanent features of the device, or may be recoded directly or by remote.

FIG. 6A shows the potential light and energy saving 63 yielded by the use of the device against an always-on profile 62.

FIG. 6B shows the potential light and energy saving 66 yielded by the use of the device against a binary on-off profile 67, whereby the light is turned off at an arbitrary, pre-determined point in time, rather than events in the surrounding environment. Also shown is the light and safety benefit 68 provided to detection events after the off signal.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. An electronic device configured to optimize illumination levels of a streetlight to reduce power consumption and light pollution, the electronic device comprising:

a microcontroller adapted to perform a process that comprises the steps of:

receive data relating to an object sensed by a sensor;

provide the received data to a machine learning algorithm arranged to determine and classify the sensed object; and output a control signal to define an illumination pattern and an illumination level of the streetlight based on determination and classification of the sensed object performed by the machine learning algorithm;

wherein, in the case that the machine learning algorithm determines and classifies the sensed object as a vehicle, the illumination level is controlled to temporarily increase from a first, base, illumination level to a second illumination level according to at least one of: a type of object detection event, a number and/or frequency of object detection events, time of day, and/or geographic location, wherein, in the case that the machine learning algorithm determines and classifies the sensed object as a person, the illumination level is controlled to temporarily increase from the first, base, illumination level to a third illumination level according to at least one of: a type of object detection event, a number and/or frequency of object detection events, time of day, and/or geographic location, wherein the second and third illumination levels are different, wherein when no additional vehicles are determined and classified by the machine learning algorithm, the illumination level is temporarily increased to the second illumination level for a first period of time until it is reduced back to the first, base, illumination level, wherein when no additional persons are determined and classified by the machine learning algorithm, the illumination level is temporarily increased to the third illumination level for a second period of time until it is reduced back to the first, base, illumination level, wherein the process restarts each time another object is detected, wherein when the process restarts more than a first predetermined number of times within a first predetermined amount of time due to the machine learning algorithm determining and classifying additional vehicles, the illumination level is temporarily increased to the second illumination level for a third period of time until it is reduced back to the first, base, illumination level, wherein the third period of time is greater than the first period of time, wherein when the process restarts more than a second predetermined number of times within a second predetermined amount of time due to the machine learning algorithm determining and classifying additional persons, the illumination level is temporarily increased to the second illumination level for a fourth period of time until it is reduced back to the first, base, illumination level, and wherein the fourth period of time is greater than the second period of time.

2. The electronic device of claim 1, wherein the machine learning algorithm is hosted on the microcontroller.

3. The electronic device of claim 1, wherein an illumination level of the output control signal is a fixed value or variable, or an illumination level of the illumination pattern is adjusted to a different illumination level at a fixed or variable rate.

4. The electronic device of claim 3, wherein the variable rate at which the illumination level is adjusted and a time period for which the illumination level is maintained at the second illumination level depends on the type of object detection event, the number and/or frequency of object detection events, time of day, and/or geographic location.

5. The electronic device of claim 1, wherein the electronic device is configured to communicate with other electronic devices in a network to notify one or more of the other electronic devices that an object has been sensed.

6. The electronic device of claim 5, wherein the electronic device notifies one or more of the other electronic based on a direction of travel of the sensed object.

7. The electronic device of claim 5, wherein the electronic device is configured to receive data from the one or more other electronic devices in a network that instruct the electronic device to adjust an illumination level of the streetlight.

8. The electronic device of claim 5, wherein the electronic device is configured to communicate with one or more of the other electronic devices to notify one or more of the other electronic devices of an illumination level that is determined in response to detection of an object.

9. The electronic device of claim 1, wherein the electronic device further comprises a connector to connect the electronic device to the streetlight.

10. The electronic device of claim 1, wherein the electronic device is included in the streetlight at the point of manufacture of streetlight, or the electronic device is retrofitted to the streetlight.

11. The electronic device of claim 1, wherein the first period is less than the second period.

12. The electronic device of claim 1, wherein the first predetermined number of times is the same as the second predetermined number of times, and wherein the first predetermined amount of time is the same as the second predetermined amount of time.

13. A method of optimizing illumination levels of a streetlight to reduce power consumption and light pollution, the method comprising:

receiving data relating to an object sensed by a sensor;

providing the received data to a machine learning algorithm arranged to determine and classify the sensed object; and outputting a control signal to define an illumination pattern and an illumination level of the streetlight based on determination and classification of the sensed object performed by the machine learning algorithm;

wherein, in the case that the machine learning algorithm determines and classifies the sensed object as a vehicle, the illumination level is controlled to temporarily increase from a first, base, illumination level to a second illumination level according to at least one of: a type of object detection event, a number and/or frequency of object detection events, time of day, and/or geographic location, wherein, in the case that the machine learning algorithm determines and classifies the sensed object as a person, the illumination level is controlled to temporarily increase from the first, base, illumination level to a third illumination level according to at least one of: a type of object detection event, a number and/or frequency of object detection events, time of day, and/or geographic location, wherein the second and third illumination levels are different, wherein when no additional vehicles are determined and classified by the machine learning algorithm, the illumination level is temporarily increased to the second illumination level for a first period of time until it is reduced back to the first, base, illumination level, wherein when no additional persons are determined and classified by the machine learning algorithm, the illumination level is temporarily increased to the third illumination level for a second period of time until it is reduced back to the first, base, illumination level, wherein the method restarts each time another object is detected, wherein when the method restarts more than a first predetermined number of times within a first predetermined amount of time due to the machine learning algorithm determining and classifying additional vehicles, the illumination level is temporarily increased to the second illumination level for a third period of time until it is reduced back to the first, base, illumination level, wherein the third period of time is greater than the first period of time, wherein when the method restarts more than a second predetermined number of times within a second predetermined amount of time due to the machine learning algorithm determining and classifying additional persons, the illumination level is temporarily increased to the second illumination level for a fourth period of time until it is reduced back to the first, base, illumination level, and wherein the fourth period of time is greater than the second period of time.

14. The method of claim 13, wherein the machine learning algorithm is hosted on a microcontroller of the streetlight.

15. The method of claim 13, wherein an illumination level of the output control signal is a fixed value or variable, or an illumination level of the illumination pattern is adjusted to a different illumination level at a fixed or variable rate.

16. A non-transitory computer-readable medium comprising instructions which, when executed by a computer, cause the computer to carry out the method of claim 13.

17. The method of claim 13, wherein the first period is less than the second period.

18. The method of claim 13, wherein the first predetermined number of times is the same as the second predetermined number of times, and wherein the first predetermined amount of time is the same as the second predetermined amount of time.

* * * * *